No. 33,219.  
PATENTED SEPT. 3, 1861.  
J. TURNER.  
LARD AND TALLOW APPARATUS.
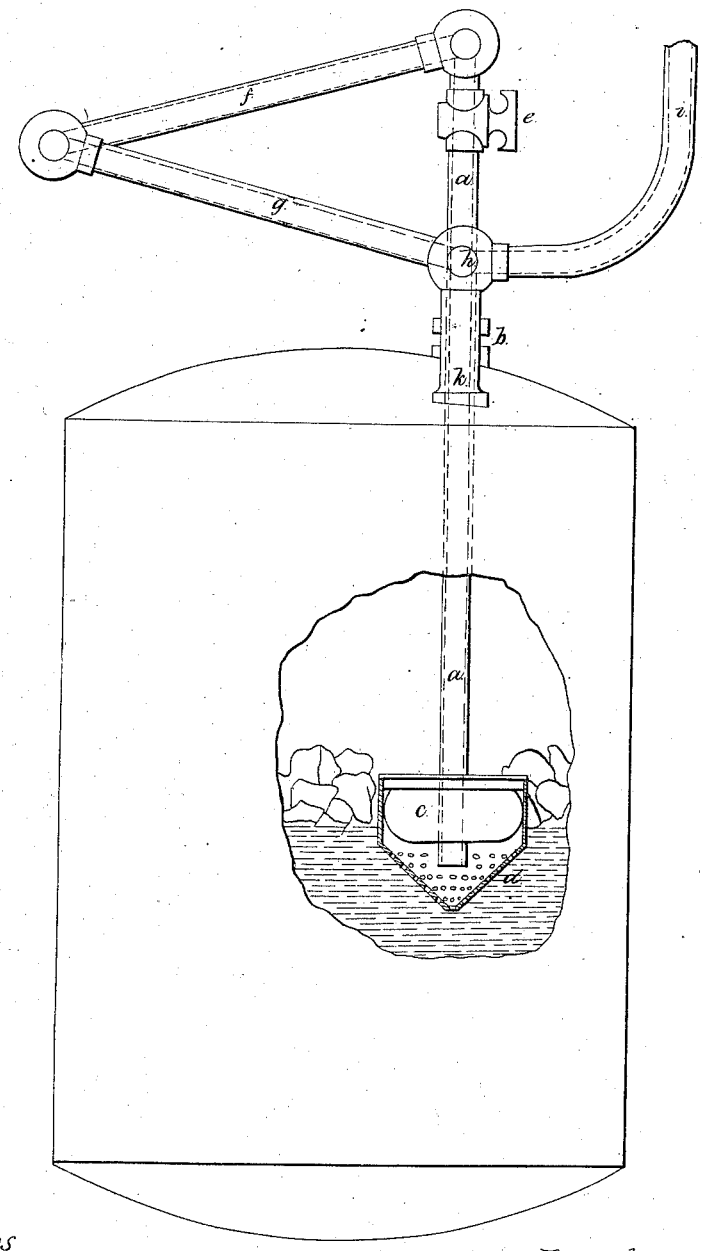
Witnesses  
Inventor  
James Turner,  
By his Attorney — Amos Broadnax

UNITED STATES PATENT OFFICE.

JAMES TURNER, OF CHICAGO, ILLINOIS.

IMPROVEMENT IN APPARATUS FOR RENDERING LARD AND TALLOW.

Specification forming part of Letters Patent No. 33,219, dated September 3, 1861.

*To all whom it may concern:*

Be it known that I, JAMES TURNER, of Chicago, in the county of Cook and State of Illinois, have invented a new and useful Improvement in Apparatus for Rendering Lard and Tallow; and I do hereby declare that the following is a full, clear, and exact description of the same, reference being had to the annexed drawing, making a part of this specification, and to the letters of reference marked thereon.

By the process hitherto practiced in rendering tallow or lard the fat is subjected to the action of steam with a pressure of about fifty pounds per square inch for ten or twelve hours before it is completely rendered, and the large proportion of fat that is rendered within the first one or two hours, amounting to three-fourths of the whole, is partially saponified by the continued exposure to the steam while the residue is being rendered, and is thereby injured in hardness and color and depreciated in value.

The object of my invention is to remove the tallow from the action of the steam as soon as it has been rendered without allowing the steam to escape from the tank; and it consists, in its most essential features, of a flexible pipe and a float that carries the mouth of the pipe just below the surface of the melted tallow in the tank. The tallow is thus forced by the pressure of the steam from the tank through the pipe to any desired point as soon as it has been rendered and before it can be damaged by overheating, and consequently becomes harder on cooling, and has a brighter and more lively color. The tallow is quickly rendered by this process, and as it is removed at once, and there is no danger of overheating, the pressure of steam, that has been hitherto restricted to fifty pounds per square inch, may be increased within the limits of the strength of the apparatus and the tank thus caused to perform twice the duty that it otherwise would. The melted tallow may be forced by the pressure of the steam in the tank to a height of one hundred feet or more, if necessary, thus enabling the renderer to cleanse it with water as often as he pleases without any handling, as it delivers itself from one vessel to another, until it finally reaches the package in which it is to be supplied to the market.

To enable others skilled in the art to make and use my invention, I will proceed to describe its construction and operation.

The drawing represents an ordinary tight tank, which may be supplied with steam and provided with a door for admission to the interior in the usual manner. A portion of the tank is represented broken away for the purpose of showing a part of the apparatus essential to my invention. The pipe $a$ $a$ passes through a stuffing-box $b$ in the top of the tank and is carried by a float $c$, which rests on the surface of the melted tallow and holds the mouth of the pipe $a$ and the strainer $d$ by which it is protected, just below the surface of the fluid fat. The pipe $a$ has a cock $e$ on its external end and is jointed to an elbow-pipe $f$, which is jointed to another elbow-pipe $g$, that is connected at a stationary point $h$ to the delivery-pipe $i$, that leads the melted tallow to any part of the building where it may be desired. The stationary point $h$, that carries the jointed connection between the elbow-pipe $g$ and the delivery-pipe $i$, is represented in the drawing as supported by the column $k$, that rests on the top of the tank; but this part of my invention may be carried out in any convenient manner, so that there is a flexible connection between the stationary pipe $i$ and the top of the movable pipe $a$.

When this apparatus is in operation, the tank is filled with lard or tallow and the steam used in the ordinary manner; but instead of the melted tallow remaining in the tank until the fat has been entirely rendered it is forced through the pipes $a$, $f$, $g$, and $i$ to any point where it is desired to have it delivered by simply opening the cock $e$ as soon as the operation of rendering has commenced. As fast as the tallow subsides in the tank the float carries the pipe $a$ down, so that the strainer always occupies the proper position for receiving the rendered lard or tallow. The float should have sufficient weight and buoyancy to overcome the friction of the stuffing-box and joints and to carry the weight.

I claim as my invention and desire to secure by Letters Patent—

The combination of the float $c$, the sliding pipe $a$, and the stationary pipe $i$, in the manner described and for the purpose specified.

JAMES TURNER.

Witnesses:
LEWIS ZAHM,
J. C. MITCHELL.